US012412324B2

United States Patent
Chen et al.

(10) Patent No.: US 12,412,324 B2
(45) Date of Patent: Sep. 9, 2025

(54) SYSTEMS AND METHODS FOR PROCESSING MEDICAL IMAGES WITH MULTI-LAYER PERCEPTRON NEURAL NETWORKS

(71) Applicant: Shanghai United Imaging Intelligence Co., Ltd., Shanghai (CN)

(72) Inventors: Zhang Chen, Brookline, MA (US); Shanhui Sun, Lexington, MA (US); Xiao Chen, Lexington, MA (US); Yikang Liu, Cambridge, MA (US); Terrence Chen, Lexington, MA (US); Chi Zhang, Fridley, MN (US)

(73) Assignee: Shanghai United Imaging Intelligence Co., Ltd., Shanghai (CN)

(*) Notice: Subject to any disclaimer, the term of this patent is extended or adjusted under 35 U.S.C. 154(b) by 379 days.

(21) Appl. No.: 18/095,149

(22) Filed: Jan. 10, 2023

(65) Prior Publication Data
US 2024/0233212 A1 Jul. 11, 2024

(51) Int. Cl.
*G06T 11/00* (2006.01)
*G06T 3/20* (2006.01)
(Continued)

(52) U.S. Cl.
CPC .............. *G06T 11/008* (2013.01); *G06T 3/20* (2013.01); *G06T 3/4046* (2013.01); *G06T 5/50* (2013.01);
(Continued)

(58) Field of Classification Search
CPC ....... G06T 11/008; G06T 3/20; G06T 3/4046; G06T 5/50; G06T 7/11; G06T 9/002;
(Continued)

(56) References Cited

U.S. PATENT DOCUMENTS 10,133,964 B2 * 11/2018 Guo ................ G06T 11/008
12,243,231 B2 * 3/2025 Georgescu .............. G06F 18/24
(Continued)

OTHER PUBLICATIONS

Zhu et al., Image reconstruction by domain-transform manifold learning, Mar. 21, 2018.

*Primary Examiner* — John Villecco
*Assistant Examiner* — Joshua B. Crockett
(74) *Attorney, Agent, or Firm* — Zhong Law, LLC (57) ABSTRACT

Described herein are systems, methods, and instrumentalities associated with using a multi-layer perceptron (MLP) neural network to process medical images of an anatomical structure. The processing may include padding an input image in accordance with the training of the MLP neural network, splitting the input image (e.g., the padded input image) into patches of a same size, and processing the patches through the MLP neural network over one or more iterations. During an iteration of the processing, the patches may be processed separately and re-combined into an intermediate image before the intermediate image is shifted to concatenate portions of the image that are derived from different patches. This way, global features of the anatomical structure may be learned and used to improve the quality of the image generated by the MLP neural network, without incurring significant computation or memory costs.

18 Claims, 7 Drawing Sheets

(51) Int. Cl.
*G06T 3/4046* (2024.01)
*G06T 5/50* (2006.01)
*G06T 7/11* (2017.01)
*G06T 9/00* (2006.01)
*G06N 3/045* (2023.01)

(52) U.S. Cl.
CPC ............... *G06T 7/11* (2017.01); *G06T 9/002* (2013.01); *G06N 3/045* (2023.01); *G06T 2207/10088* (2013.01); *G06T 2207/20021* (2013.01); *G06T 2207/20084* (2013.01); *G06T 2207/20221* (2013.01); *G06T 2207/30016* (2013.01); *G06T 2211/424* (2013.01)

(58) Field of Classification Search
CPC . G06T 2207/10088; G06T 2207/20021; G06T 2207/20084; G06T 2207/20221; G06T 2207/30016; G06T 2211/424; G06T 7/0012; G06T 3/4076; G06T 3/4053; G06N 3/045
See application file for complete search history.

(56) References Cited

U.S. PATENT DOCUMENTS

| | | | |
|---|---|---|---|
| 2022/0122218 A1* | 4/2022 | Yoon | G06T 3/40 |
| 2023/0116285 A1* | 4/2023 | Cui | H04N 19/186 |
| | | | 375/240.08 |
| 2024/0071033 A1* | 2/2024 | Lee | G06V 20/69 |
| 2024/0161327 A1* | 5/2024 | Chen | G06T 3/40 |

\* cited by examiner

SYSTEMS AND METHODS FOR PROCESSING MEDICAL IMAGES WITH MULTI-LAYER PERCEPTRON NEURAL NETWORKS

BACKGROUND

Medical imaging such as magnetic resonance imaging (MRI) plays an important role in disease detection and treatment, and in recent years there has been an increasing use of deep learning (DL) techniques for generating and/or improving the quality of medical images. While these techniques have achieved impressive results, images obtained using conventional DL approaches still suffer from blurriness, loss of details, a high level of noise, and/or other shortcomings. Accordingly, new or modified neural network structures, machine learning (ML) models, and/or training techniques may be desirable to improve the quality of medical imaging, for example, in the areas of image reconstruction, super-resolution, denoising, etc.

SUMMARY

Described herein are systems, methods, and instrumentalities associated with using a multi-layer perceptron (MLP) neural network to process (e.g., reconstruct, denoise, segment, etc.) medical images of an anatomical structure. According to one or more embodiments of the present disclosure, an apparatus capable of performing the image processing tasks described herein may include a processor configured to obtain an input image of an anatomical structure (e.g., such as a human brain), process the input image through an MLP neural network over one or more iterations, and generate an output image of the anatomical structure in response to processing the input image of the anatomical structure through the MLP neural network. During a first iteration of the one or more iterations, the processor may be configured to divide the input image into at least a first patch having a specific image size and a second patch having the specific image size (e.g., the input image may be of different sizes while the patches may have the same size). The processor may be further configured to process the first patch and the second patch through the MLP neural network to derive a first intermediate image, wherein the first intermediate image may include a first portion derived based on the first patch and a second portion derived based on the second patch. The first intermediate image may then be shifted (e.g., by appending the first portion of the first intermediate image to the second portion of the first intermediate image) such that the first portion and the second portion may be concatenated in the shifted first intermediate image.

In examples, the operations described above may be repeated in a second iteration of the one or more iterations, during which the processor may be further configured to divide the shifted first intermediate image into at least a third patch having the specific image size and a fourth patch of the same specific image size. The processor may process the third patch and the fourth patch through the MLP neural network to derive a second intermediate image, wherein the second intermediate image may include a first portion derived based on the third patch and a second portion derived based on the fourth patch. The second intermediate image may then be shifted (e.g., similarly to the first intermediate image) such that the first portion and the second portion of the second intermediate image may be concatenated in the shifted second intermediate image.

In examples, the processor being configured to generate the output image of the anatomical structure in response to processing the input image through the MLP neural network may comprise the processor being configured to reverse an effect caused by the shifting of the first intermediate image. For example, the processor may be configured to reverse the effect caused by the shifting of the first intermediate image by restoring the respective original positions of the first patch and the second patch as in the input image. In examples, the processor may be further configured to apply a padding (e.g., circular padding) to the input image of the anatomical structure so as to allow the first patch and the second patch to both have the specific image size. This may be accomplished, for example, by padding the input image such that the size of the input image may be increased to a multiple of the specific image size. Subsequently, when generating the output image, the processor may be configured to remove the padding applied to the input image from the output image.

In examples, the processor may be configured to obtain the input image of the anatomical structure by obtaining under-sampled magnetic resonance (MR) data associated with the anatomical structure and generate the input image based on the under-sampled MR data. For instance, the processor may generate the input image using a convolutional neural network (CNN) trained for reconstructing the under-sampled MR data. In examples, the input image may include a multi-dimensional MR image comprising a read-out dimension and a phase-encoding dimension, and the MLP neural network may be applied to each dimension of the input image.

BRIEF DESCRIPTION OF THE DRAWINGS

A more detailed understanding of the examples disclosed herein may be obtained from the following description, given by way of example in conjunction with the accompanying drawing.

DETAILED DESCRIPTION

Disclosed herein are deep learning (DL) based techniques that may be used to facilitate the generation, processing, and/or analysis of medical images such as magnetic resonance (MR) images. Embodiments of these DL techniques may be described herein using MR images as examples, but those skilled in the art will understand that the described techniques may also be used to generate, process and/or analyze other types of images including, e.g., X-ray images, computed tomography (CT) images, photoacoustic tomography (PAT) images, etc.

Figure 1:
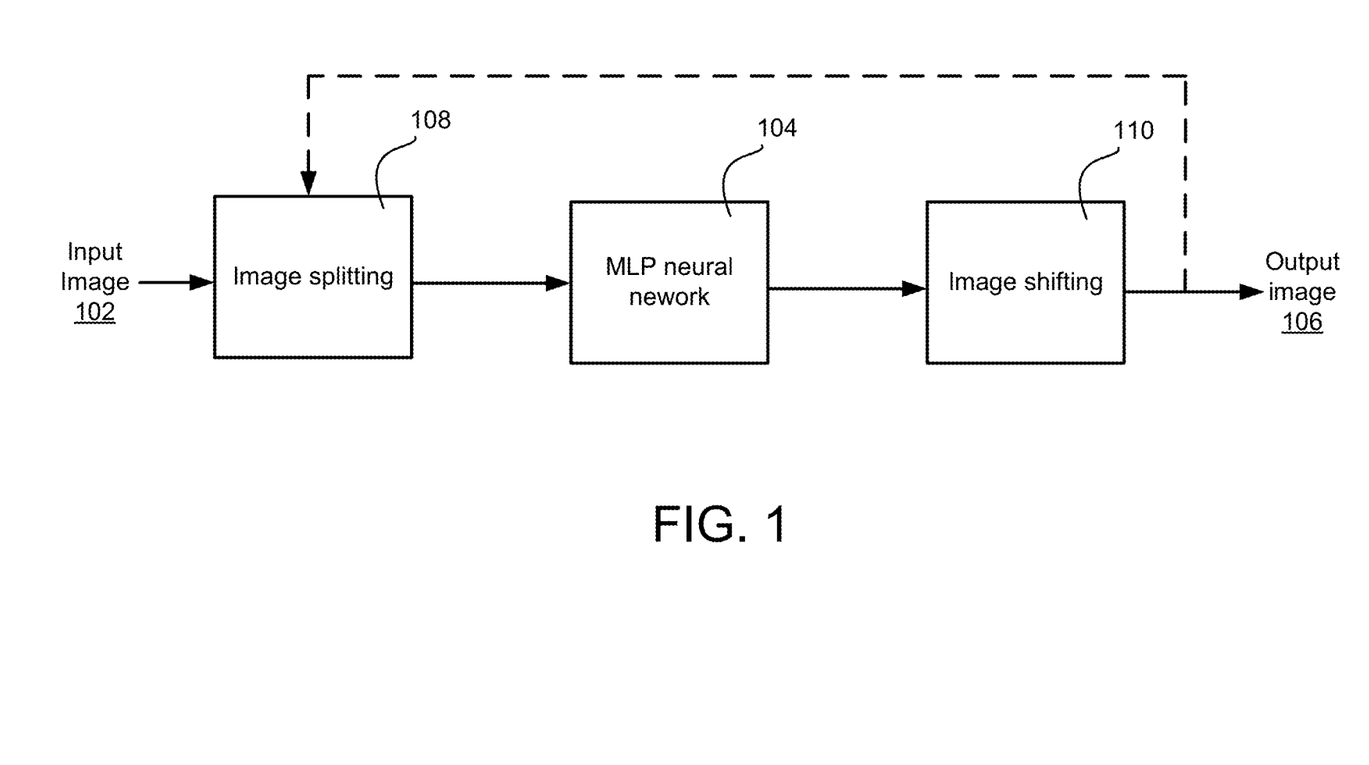
FIG. 1 is a simplified block diagram illustrating an example of processing an image of an anatomical structure using an MLP neural network in accordance with one or more embodiments described herein.

FIG. 1 illustrates an example of processing an input image 102 of an anatomical structure (e.g., such as a human brain) using a multi-layer perceptron (MLP) neural network 104. Using MRI as an example, the input image 102 may include an MR image generated based on under-sampled spatial frequency information collected about the anatomical collected during an MRI procedure. The spatial frequency information may be referred to herein as k-space data, and the under-sampled k-space data may be converted into the MR image, for example, by applying an inverse Fourier transform (iFFT) to the under-sampled k-space data. In examples, the MR image obtained from the under-sampled k-space data may be provided to MLP neural network 104 for processing, while in other examples the MR image obtained from the under-sampled k-space data may go through an image reconstruction process before being further processed by the MLP neural network 104. In examples where additional reconstruction is applied before the reconstructed image is provided to the MLP neural network for further processing, the reconstruction may be performed using an image reconstruction neural network (e.g., such as a convolutional neural network) that may be pre-trained or trained together with the MLP network. Either or both of the reconstruction network and the MLP network may be aided by a data consistency (DC) module configured to constrain the reconstruction such that the reconstructed image may match the actually acquired k-space data.

The under-sampling of the k-space data described above may serve the purpose of accelerating an MRI procedure, but may also cause negative effects (e.g., at least under a relatively high acceleration rate) to the resulting MRI image including, for example, noise, aliasing artifacts, blurriness, and/or the like. The MLP neural network 104 may be trained to eliminate or at least reduce the negative effects caused by k-space under-sampling and generate an output image 106 of the anatomical structure with improved quality over the input image 102, for example, with respect to one or more of a noise level, amount of aliasing, blurriness, etc. As will be described in greater detail below, the MLP neural network 104 may, through training, acquire the ability to identify key and/or detailed features of the anatomical structure based on global characteristics of the input image 102 and may utilize these features to improve the quality of the output image 106 (e.g., to recover the finer details of the anatomical structure that may be lost due to the under-sampling process). The size of the input image 102 may vary, for example, depending on the imaging task at hand and/or the equipment used to generate the image. On the other hand, the internal structure of the MLP neural network 104 (e.g., the number of neurons in the network) may dictate that the input image be of a specific size. As such, the input image 102 may be split at 108 into patches of the specific image size that the MLP neural network 104 may be configured to process. This way, the size of the input image 102 may vary (e.g., be arbitrary) without affecting the operation of the MLP neural network, allowing for greater flexibility than conventional methods that may require the input image 102 to have a fixed size or may exclude a considerable number of voxels or introduce additional dimensions in order to accommodate images of flexible sizes or resolutions.

In some embodiments of the present disclosure, the input image 102 may be padded (e.g., to increase the size of the input image 102 to a multiple of the specific image size described above) so as to allow the patches derived from the splitting operation at 108 to all have the same size as the specific image size. Further, as will be described in greater detail below, an image (e.g., an intermediate image reconstructed based on the input patches) generated by the MLP neural network 104 may be subject to an image shifting process at 110 (e.g., to correlate the features of the anatomical structure captured in the different patches), and the image splitting operation 108, MLP processing operation 104, and image shifting operation 110 may be repeated (e.g., over one or more iterations as indicated by the dashed arrow in FIG. 1) to further aggregate cross-patch information regarding the anatomical structure such that the quality of the output image 106 may be further improved by taking into consideration global characteristics of the anatomical structure (e.g., rather than local characteristics focused by conventional methods such as those based on a convolutional neural network).

The MLP neural network 106 may include multiple layers such as an input layer, an output layer, and one or more hidden layers (e.g., one or more fully-connected layers and one or more linear or non-linear activation layers) with respective weights that may be trained to implement a linear or non-linear mapping (e.g., from an under-sampled MRI image to a fully-sampled MRI image, from a blurry reconstructed MRI image to a clear reconstructed MRI image, etc.) in a forward direction, while the training of the network may be conducted via backpropagation. For example, a (e.g., each) layer of the MLP neural network 106 may be configured to receive as input a set of features and perform a weighted calculation such as a weighted sum of the features using the weights assigned to the layer. The result of this computation may then be passed onto a normalization layer and/or an activation layer or function (e.g., a sigmoid function), which may produce the output of the layer. The training of the MLP neural network 104 may include adjusting the weights associated with the layers of the network so as to minimize the error of a prediction performed on the training data (e.g., based on a loss function such as a mean squared error (MSE) between the prediction result and a corresponding ground truth). Since the operations of the MLP neural network 104 may involve (e.g., only involve) matrix multiplications and in-place non-linear activations, it may provide a more efficient way (e.g., with respect to the amount of computation and memory involved) for utilizing global information to process medical images (e.g., for tasks like image reconstruction, denoising, segmentation, etc.). This may be because, for example, conventional DL techniques such as those based only on a convolutional neural network (CNN) may model an image data acquisition task (e.g., MRI data acquisition in a k-space) as an image-domain convolution operation, while considering the recovery of an image from the acquired data as a deconvolution operation in the image domain. Since the CNN may depend on highly localized convolutions, an enlarged kernel size (e.g., as large as the image itself) may be needed to solve the deconvolution problem, which may be impractical for at least some medical imaging tasks (e.g., such as MRI reconstruction) due to memory and/or processing speed constraints of the computer device involved.

Figure 2:
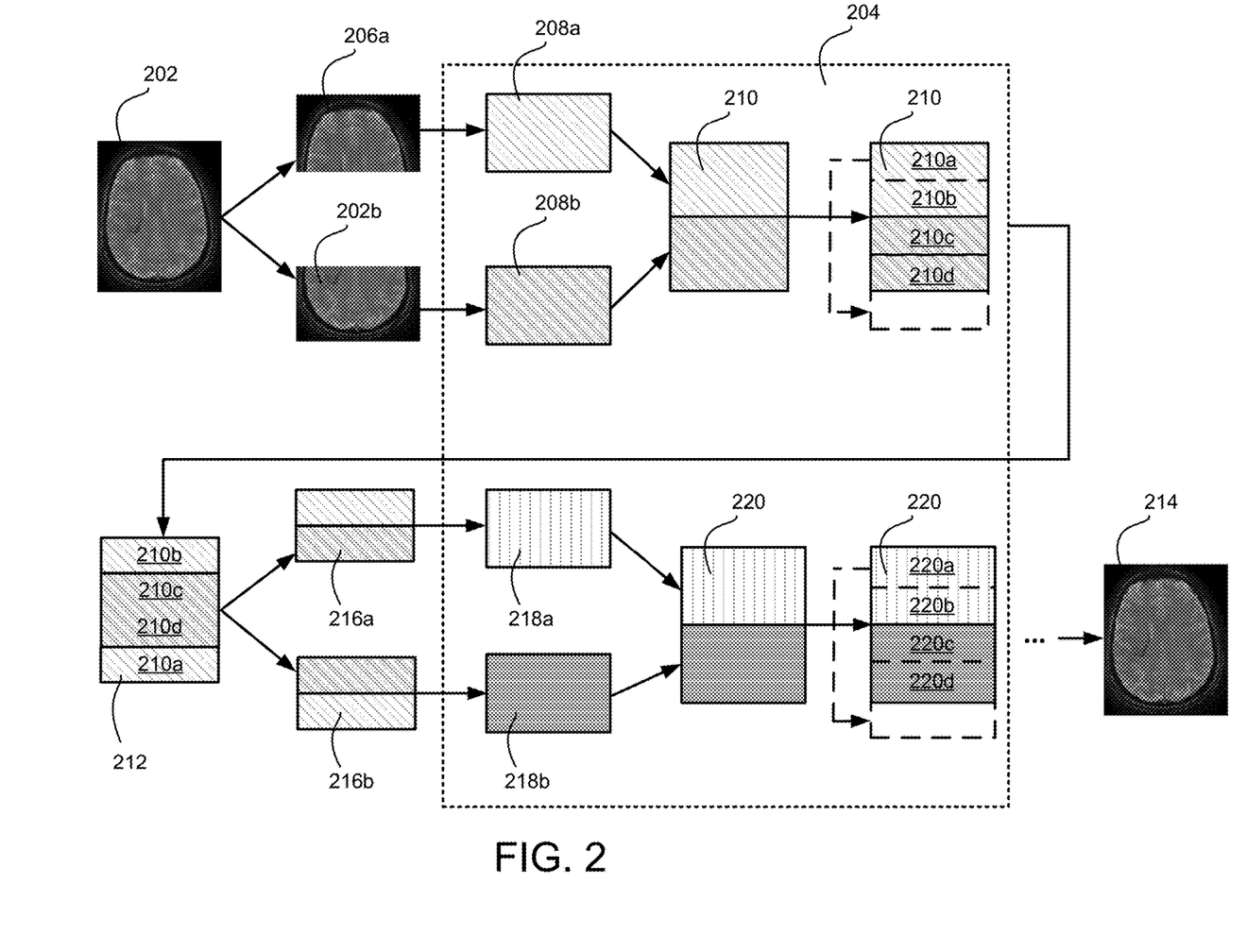
FIG. 2 is another simplified diagram illustrating an example of processing a medical image through an MLP neural network in accordance with one or more embodiments described herein.

FIG. 2 illustrates an example of processing an input image 202 of an anatomical structure (e.g., a human brain) through an MLP neural network 204 (e.g., the MLP neural network 104 of FIG. 1). As shown, the input image 202 (e.g., which may be of different sizes) may be split into patches having a same specific size (e.g., depending on the structure such as the number of neurons of the MLP neural network). While only two patches are shown in FIG. 2, those skilled in the art will appreciate that the input image 202 may be split into more than two patches depending on the size of the input image 202 and the specific image size that the MLP neural network 204 is configured to handle. Further, as will be described in greater detail below, the input image 202 may be padded in at least some situations (e.g., when the input image size is not a multiple of the specific image size) to allow the input image 202 to be split into patches of the specific image size.

As shown, the input image 202 may be processed through the MLP neural network over one or more iterations. For example, during a first iteration of the processing, the input image 202 may be split into a first patch 206a having the specific image size and a second patch 206b having the same image size. The first and second patches may then be processed through the MLP neural network to derive a first output 208a and a second output 208b, respectively. The first output 208a may be, for example, an image of the anatomical structure reconstructed based on patch 206a (e.g., based on features extracted by the MLP neural network from patch 206a), while the second output 208b may be, for example, an image of the anatomical structure reconstructed based on patch 206b (e.g., based on features extracted by the MLP neural network from patch 206b). A first intermediate image 210 may then be derived based on the first output 208a and the second output 208b, for example, by stitching together or otherwise combining the first and second outputs. As such, the first intermediate image 210 may include portions (e.g., 210a and 210b) derived based on patch 206a and portions (e.g., 210c and 210d) derived based on patch 206b. Subsequently, a shifting operation (e.g., based on a circular shifting window) may be performed on the first intermediate image 210 such that a first portion (e.g., 210a) of the first intermediate image derived based on patch 208a and a second portion (e.g., 210d) of the first intermediate image derived based on patch 208b may be concatenated in an image 212 resulting from the shifting operation. For instance, the shifting operation may include moving the first portion 210a of the first intermediate image such that the first portion 210a may be appended to the second portion 210d of the first intermediate image.

The operations described above (e.g., splitting, MLP processing, and/or shifting) may be repeated over one or more additional iterations before an output image 214 of the anatomical structure may be generated based on the operations. For example, during a second iteration of the processing, image 212 may be split into a third patch 216a having the specific image size and a fourth patch 216b having the same image size. The third and fourth patches of image 212 may then be processed through the MLP neural network to derive a third output 218a and a fourth output 218b, respectively. The third output 218a may be, for example, an image of the anatomical structure reconstructed based on patch 216a (e.g., based on features extracted by the MLP neural network from patch 216a), while the second output 218b may be, for example, an image of the anatomical structure reconstructed based on patch 216b (e.g., based on features extracted by the MLP neural network from patch 216b). A second intermediate image 220 may then be derived based on the third output 218a and the fourth output 218b, for example, by stitching together or otherwise combining the third and fourth outputs. As such, the second intermediate image 220 may include portions (e.g., 220a and 220b) derived based on patch 216a and portions (e.g., 210c and 210d) derived based on patch 216b, from which further splitting, MLP processing, and re-combination may be applied to obtain the output image 214. The amount of shifting occurred during the process described herein may be recorded and the effects caused by the shifting (e.g., movements of patches 206a and 206b from their original positions and/or order in input image 202) may be reversed (e.g., the respective original positions and/or order of the moved patches may be restored) when generating the output image 214.

Through the iterative processing operations described herein, global information (e.g., cross-patch features) of the anatomical structure depicted in the input image 202 may be aggregated (e.g., via the splitting, MLP processing, re-combining, and shifting operations illustrated by FIG. 2) and used (e.g., during feature extraction) to improve the quality of the input image 202, e.g., with respect to blurriness, noise, aliasing effects, etc. In examples, the processing of the different patches and/or the different iterations described herein may be carried out in respective MLP blocks (e.g., sub-networks of the MLP network 204), and the processing may be applied to one or more dimensions of the input image 202. For example, the input image 202 may be a multi-dimensional MRI image comprising, e.g., a readout (RO) dimension, a phase encoding (PE) dimension, and/or a slice-phase-encoding (SPE) dimension. In these examples, the operations described herein may be applied to one or more (e.g., each) of the dimensions and the parameters of the MLP neural network may be shared (e.g., between different MLP blocks configured to process different patches) within each specific dimension.

It should be noted here that even though the MLP neural network may be described as being used for processing images, those skilled in the art will appreciate that the MLP neural network may also be used for processing data (e.g., k-space data) corresponding to the images or for processing both the images and the corresponding data. For example, in one part of the MLP neural network, the disclosed techniques may be applied to an MRI image, while in another part of the MLP neural network, the disclosed techniques may be applied to k-space data. It should also be noted that the MLP neural network may include higher dimensional fully connected layers (e.g., two-dimensional or higher), in which case image patches may be vectorized and the fully connected layers may be applied to the vectorized image patches. Further, while the image shifting operation may be described herein as being applied to an image of a specific dimension, those skilled in the art will appreciate that the shifting window may also move towards a different dimension.

Figure 3:
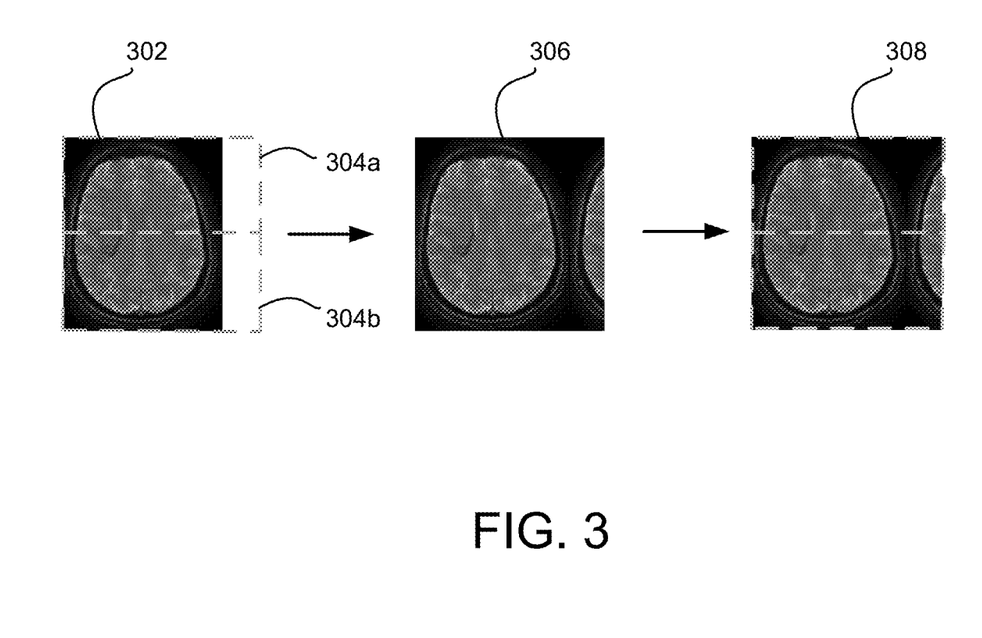
FIG. 3 is a simplified diagram illustrating an example of padding a medical image of an anatomical structure before processing the image to an MLP neural network in accordance with one or more embodiments described herein.

FIG. 3 illustrates an example of padding an image 302 of an anatomical structure (e.g., the input image 102 of FIG. 1 or 202 of FIG. 2) before processing the image using the MLP neural network described herein. As discussed earlier, image 302 may be of different sizes and if the size of image 302 is not a multiple of a specific size (e.g., shown by dashed shapes 304a and 304b) in accordance with the structure of the MLP neural network, padding may be applied to image 302 to increase the size of the image to a multiple of the specific size. The padding may be applied using various techniques including, for example, a circular padding performed based on image 302 itself, as shown at 306 (e.g., by replicating image 302 in multiple directions and clipping the expanded image into the desired image size). As shown in the figure, after the padding is applied, the resulting image 308 may have a size that is a multiple (e.g., twice) of the specific image size and multiple (e.g., two) patches with the specific image size may be obtained from padded image 308 and processed by the MLP neural network. The padding added during this process may subsequently be removed from an output image generated by the MLP neural network (e.g., output image 106 of FIG. 1 or 214 of FIG. 2) such that the output image may have the same size as image 302.

Figure 4:
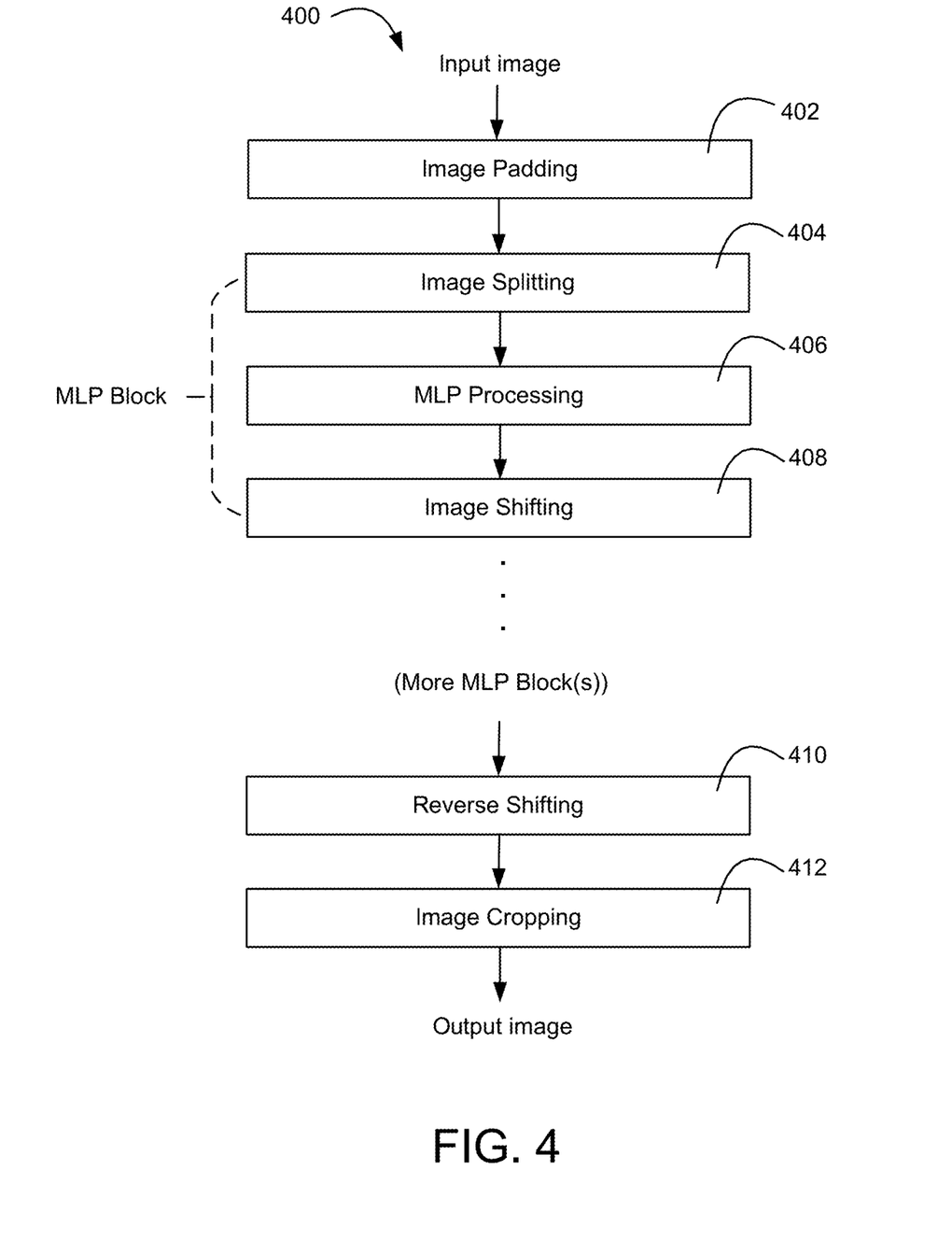
FIG. 4 is a simplified flow diagram illustrating an example process for processing a medical image of an anatomical structure using an MLP neural network in accordance with one or more embodiments described herein.

FIG. 4 illustrates an example process 400 for processing an input image (e.g., an MRI image) of an anatomical structure using an MLP neural network. As shown, the input image may be padded at 402 (e.g., via circular padding), for example, if the size of the input image is not a multiple of a specific size in accordance with the structure of the MLP neural network. At 404, the input image (e.g., with padding) may be split into multiple patches, each of which may be in the size that the MLP neural network is trained to process. The patches may be processed (e.g., separately) at 406, through which an intermediate image may be generated that may include portions derived based on a first patch, portions derived based on a second patch, etc. At 408, the intermediate image may be shifted in a manner that concatenates a portion of the intermediate image derived based on the first patch and a portion of the intermediate image derived based on the second patch. The foregoing operations may be carried out in a first block of the MLP neural network and may be repeated over one or more additional iterations (e.g., through one or more additional MLP blocks). At 410, a reverse shifting may then be applied to the image obtained from the iterative process described above to reverse the effects of the shifting performed at 408 (e.g., to restore the original positions of the patches as in the input image). The reverse-shifted image may be further cropped at 412 to remove the padding added at 402 (e.g., if any) before an output image is generated as a result of the process 400 that may correspond to an improved version of the input image (e.g., with reduced blurriness, finer details, less noise, etc.).

Figure 5:
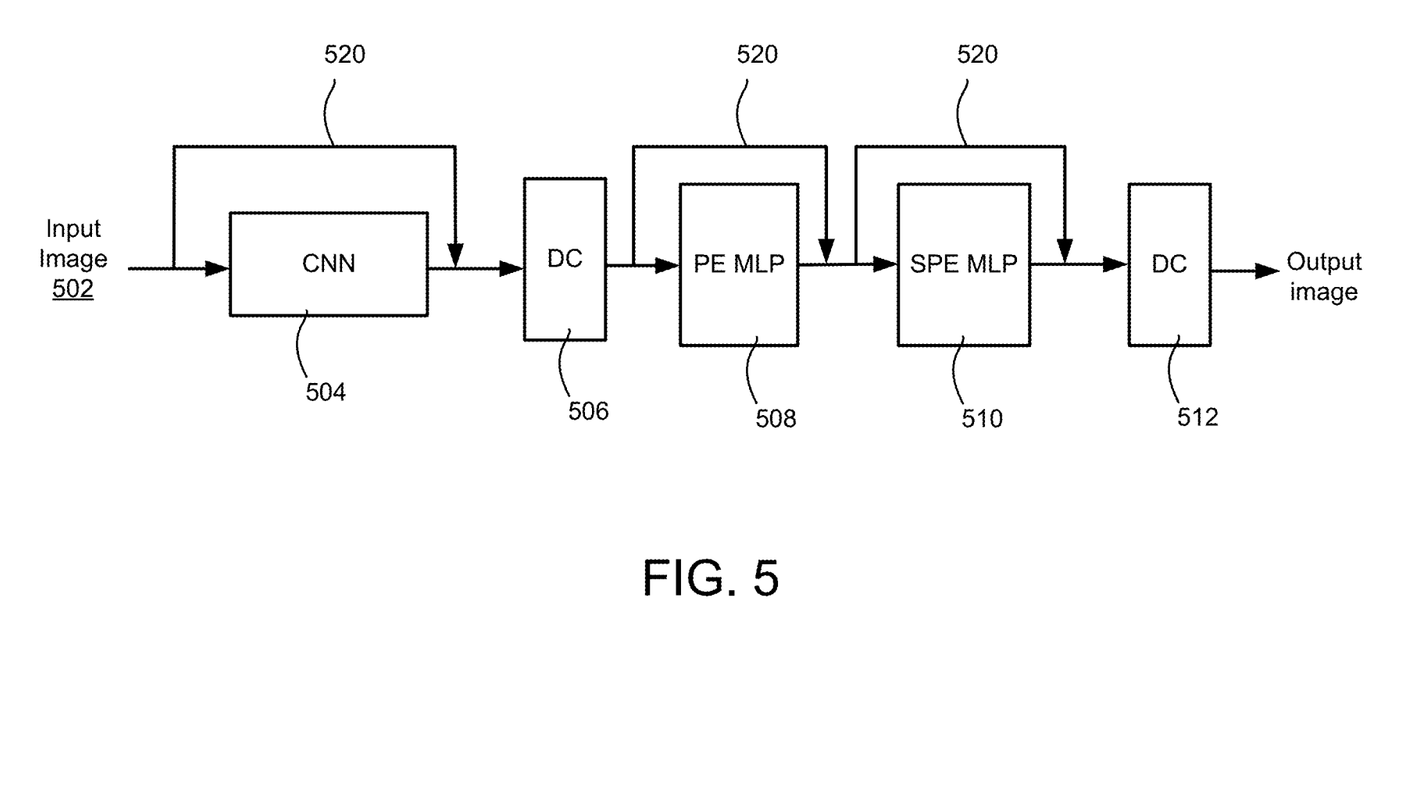
FIG. 5 is a simplified block diagram illustrating an example of using an MLP neural network in conjunction with a convolutional neural network for reconstructing an MRI image in accordance with one or more embodiments described herein.

In examples, the MLP neural network described herein may be used in conjunction with other DL based techniques for generating and/or improving the quality of a medical image. FIG. 5 illustrates an example in which an MLP neural network may be used to process (e.g., improve the quality of) a medical image generated by a CNN such as a CNN trained for reconstructing an under-sampled MRI image. As described herein, such an under-sample MRI image (e.g., 502 in the figure) may be obtained based on under-sampled k-space data, for example, by apply an iFFT to the under-sampled k-space data, and the CNN (e.g., 504 in the figure) may be trained for predicting the details missing from the under-sampled image 502 and generating a reconstructed image including those details. The CNN may include an input layer and one or more convolutional layers, pooling layers, and/or fully-connected layers. The input layer may be configured to receive the input image while each of the convolutional layers may include a plurality of convolution kernels or filters with respective weights for extracting features associated with an underlying anatomical structure from the input image. The convolutional layers may be followed by batch normalization and/or linear or non-linear activation (e.g., such as a rectified linear unit (ReLU) activation function), and the features extracted through the convolution operations may be down-sampled through one or more pooling layers to obtain a representation of the features, for example, in the form of a feature vector or a feature map. The CNN may further include one or more un-pooling layers and one or more transposed convolutional layers. Through the un-pooling layers, the features extracted through the operations described above may be up-sampled, and the up-sampled features may be further processed through the one or more transposed convolutional layers (e.g., via a plurality of deconvolution operations) to derive an up-scaled or dense feature map or feature vector, which may then be used to predict a reconstructed image.

CNN 504 may include or may be configured to operate with a data consistency (DC) component (e.g., a DC layer) 506 configured to ensure that the image reconstructed by CNN 504 is consistent with the data collected from the k-space. For instance, the DC component 506 may be configured to convert an image predicted by CNN 504 into a corresponding k-space dataset (e.g., by applying an FFT to the image), update (e.g., replace or modify) certain parts of the k-space dataset with real measurements of the k-space (e.g., the under-sampled MRI data used by CNN 504 to generate the image), and convert the updated k-space dataset back to the image domain (e.g., via an iFFT) to obtain an updated image.

The image obtained through CNN 504 and/or DC component 506 may be further processed through the MLP neural network using the techniques described herein (e.g., the image obtained via the CNN and/or the DC component may be provided to the MLP network as input image 102 of FIG. 1 or input image 202 of FIG. 2). In examples, the image may be a multi-dimensional image including, for example, a PE dimension and/or a SPE dimension, and the MLP neural network may be used in each of those dimensions (e.g., shown as 508 and 510 in FIG. 5), as described herein. The MLP neural network may also include or be configured to operate with a DC component (e.g., 512 in FIG. 5), which may have similar functionalities as DC component 506. Further, as shown in FIG. 5, one or more of CNN 504, MLP 508, or MLP 510 may include skip connections 520 that may be configured to feed the output of a particular layer in a network to later layers in the network (e.g., skipping one or more layers in between) so as to give more context to the later layers and increase the depth of the learning (e.g., by preventing vanishing gradients).

It should be noted here that even though the example illustrated in FIG. 5 uses a CNN, those skilled in the art will understand that the CNN may be removed and PE- and/or SPE-wise MLP may be applied directly to input image 502 to achieve the reconstruction. It may also be possible to remove the CNN and achieve the reconstruction by, e.g., mixing the MLP with one or more convolutional layers, applying additional MLP along a read-out (RO) direction of the k-space, etc.

Figure 6:
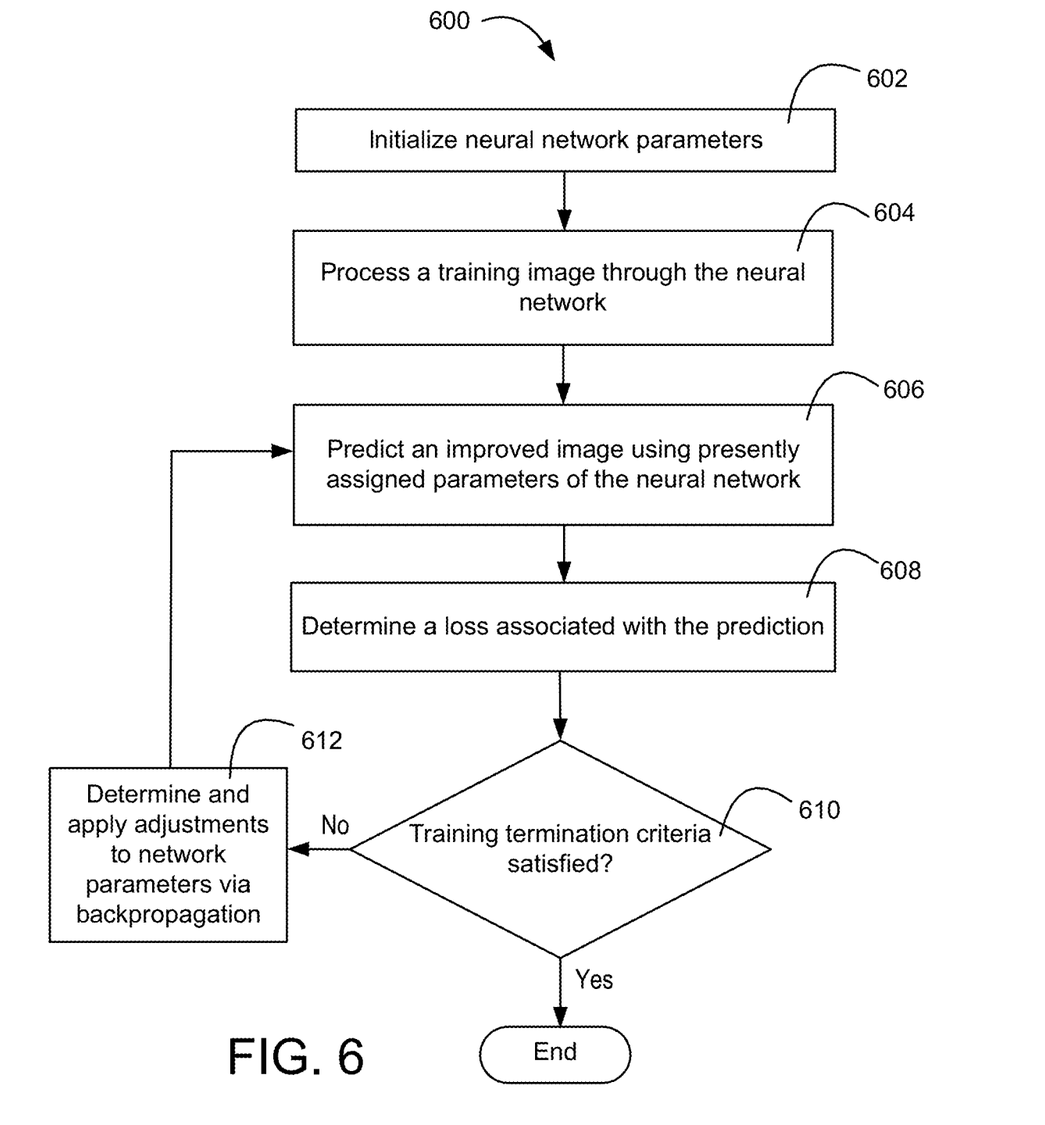
FIG. 6 is a flow diagram illustrating an example process for training an artificial neural network to perform the medical image processing tasks described herein.

FIG. 6 illustrates an example process 600 for training an artificial neural network (e.g., the MLP neural network described herein) to perform the medical image processing tasks described herein. As shown, the training process may include initializing parameters of the neural network (e.g., weights associated with various layers of the neural network) at 602, for example, based on samples from one or more probability distributions or parameter values of another neural network having a similar architecture. The training process 600 may further include processing a training image (e.g., an under-sampled MRI image or a reconstructed, but blurry and/or noisy MRI image) at 604 using presently assigned parameters of the neural network, and making a prediction for an improved image (e.g., a reconstructed MRI image with reduced blurriness and/or noise) at 606. The predicted image may be compared to a ground truth image at 608 to determine a loss associated with the prediction at 608. Such a loss may be determined, for example, based on a loss function such as mean squared errors between the predicted image and the ground truth image, an L1 norm, an L2, norm, etc. At 610, the loss may be evaluated to determine whether one or more training termination criteria are satisfied. For example, the training termination criteria may be determined to be satisfied if the loss is below a threshold value or if the change in the loss between two training iterations falls below a threshold value. If the determination at 610 is that the termination criteria are satisfied, the training may end; otherwise, the presently assigned network parameters may be adjusted at 612, for example, by backpropagating a gradient descent of the loss function through the network before the training returns to 606.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 7:
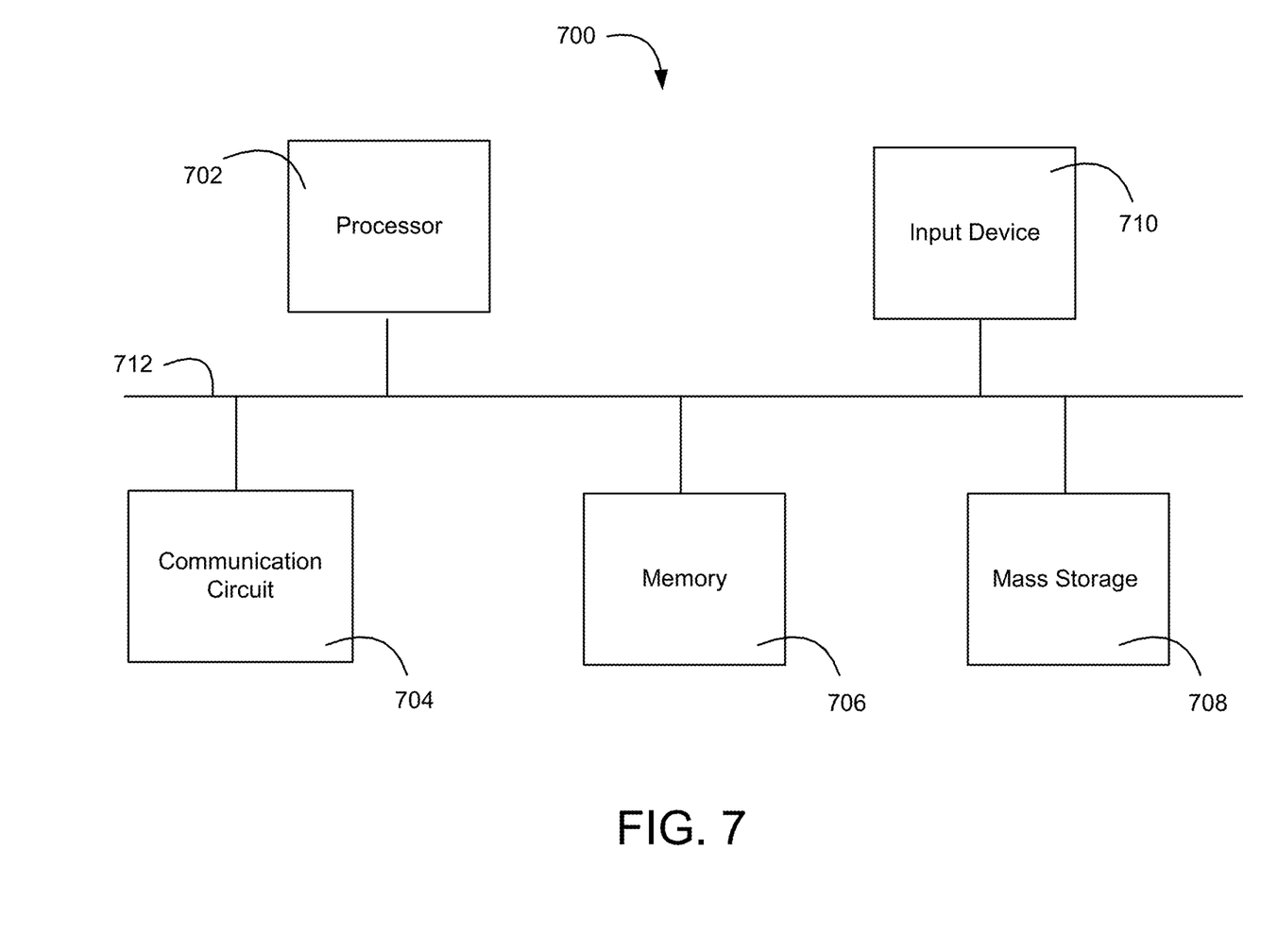
FIG. 7 is a simplified block diagram illustrating example components of an apparatus that may be configured to perform the medical image processing tasks described herein.

The systems, methods, and/or instrumentalities described herein may be implemented using one or more processors, one or more storage devices, and/or other suitable accessory devices such as display devices, communication devices, input/output devices, etc. FIG. 7 is a block diagram illustrating an example apparatus 700 that may be configured to perform the medical image processing tasks described herein. As shown, apparatus 700 may include a processor (e.g., one or more processors) 702, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 700 may further include a communication circuit 704, a memory 706, a mass storage device 708, an input device 710, and/or a communication link 712 (e.g., a communication bus) over which the one or more components shown in the figure may exchange information.

Communication circuit 704 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 706 may include a storage medium (e.g., a non-transitory storage medium) configured to store machine-readable instructions that, when executed, cause processor 702 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 708 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 702. Input device 710 may include a keyboard, a mouse, a voice-controlled input device, a touch sensitive input device (e.g., a touch screen), and/or the like for receiving user inputs to apparatus 700.

It should be noted that apparatus 700 may operate as a standalone device or may be connected (e.g., networked, or clustered) with other computation devices to perform the functions described herein. And even though only one instance of each component is shown in FIG. 7, a skilled person in the art will understand that apparatus 700 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
a processor configured to:
obtain an input image of an anatomical structure;
process the input image through a multi-layer perceptron (MLP) neural network over one or more iterations, wherein, during a first iteration of the one or more iterations, the processor is configured to:
divide the input image into at least a first patch having a specific image size and a second patch having the specific image size;
process the first patch and the second patch through the MLP neural network to derive a first intermediate image, wherein the first intermediate image includes a first portion derived based on the first patch and a second portion derived based on the second patch; and
shift the first intermediate image such that the first portion and the second portion of the first intermediate image are concatenated in the shifted first intermediate image; and
generate an output image of the anatomical structure in response to processing the input image of the anatomical structure through the MLP neural network, wherein the processor being configured to generate the output image comprises the processor being configured to reverse an effect caused by the shifting of the first intermediate image.

2. The apparatus of claim 1, wherein, during a second iteration of the one or more iterations, the processor is configured to:
  divide the shifted first intermediate image into at least a third patch having the specific image size and a fourth patch having the specific image size;
  process the third patch and the fourth patch through the MLP neural network to derive a second intermediate image, wherein the second intermediate image includes a first portion derived based on the third patch and a second portion derived based on the fourth patch; and
  shift the second intermediate image such that the first portion and the second portion of the second intermediate image are concatenated in the shifted second intermediate image.

3. The apparatus of claim 1, wherein the processor being configured to reverse the effect caused by the shifting of the first intermediate image comprises the processor being configured to restore, in the output image of the anatomical structure, respective original positions of the first patch and the second patch as in the input image.

4. The apparatus of claim 1, wherein the processor being configured to shift the first intermediate image comprises the processor being configured to append the first portion of the first intermediate image to the second portion of the first intermediate image.

5. The apparatus of claim 1, wherein the processor is further configured to apply a padding to the input image of the anatomical structure so as to allow the first patch and the second patch to both have the specific image size.

6. The apparatus of claim 5, wherein the padding increases a size of the input image to a multiple of the specific image size.

7. The apparatus of claim 5, wherein the processor being configured to generate the output image of the anatomical structure comprises the processor being configured to remove the padding applied to the input image from the output image.

8. The apparatus of claim 1, wherein the processor being configured to obtain the input image of the anatomical structure comprises the processor being configured to obtain under-sampled magnetic resonance (MR) data associated with the anatomical structure and generate the input image based on the under-sampled MR data.

9. The apparatus of claim 8, wherein the processor being configured to generate the input image based on the under-sampled MR data comprises the processor being configured to generate the input image using a convolutional neural network trained for reconstructing the under-sampled MR data.

10. The apparatus of claim 1, wherein the input image includes a multi-dimensional magnetic resonance (MR) image of the anatomical structure, the multi-dimensional MR image comprising a readout dimension and a phase-encoding dimension.

11. A method of processing medical images, the method comprising:
  obtaining an input image of an anatomical structure;
  processing the input image through a multi-layer perceptron (MLP) neural network over one or more iterations, wherein a first iteration of the one or more iterations comprises:
    dividing the input image into at least a first patch having a specific image size and a second patch having the specific image size;
    processing the first patch and the second patch through the MLP neural network to derive a first intermediate image, wherein the first intermediate image includes a first portion derived based on the first patch and a second portion derived based on the second patch; and shifting the first intermediate image such that the first portion and the second portion of the first intermediate image are concatenated in the shifted first intermediate image; and
  generating an output image of the anatomical structure in response to processing the input image of the anatomical structure through the MLP neural network, wherein the generating of the output image comprises reversing an effect caused by the shifting of the first intermediate image.

12. The method of claim 11, wherein a second iteration of the one or more iterations comprises:
  dividing the shifted first intermediate image into at least a third patch having the specific image size and a fourth patch having the specific image size;
  processing the third patch and the fourth patch through the MLP neural network to derive a second intermediate image, wherein the second intermediate image includes a first portion derived based on the third patch and a second portion derived based on the fourth patch; and
  shifting the second intermediate image such that the first portion and the second portion of the second intermediate image are concatenated in the shifted second intermediate image.

13. The method of claim 11, wherein reversing the effect caused by the shifting of the first intermediate image comprises restoring, in the output image of the anatomical structure, respective original positions of the first patch and the second patch as in the input image.

14. The method of claim 11, wherein shifting the first intermediate image comprises appending the first portion of the first intermediate image to the second portion of the first intermediate image.

15. The method of claim 11, further comprising applying a padding to the input image of the anatomical structure so as to allow the first patch and the second patch to both have the specific image size, wherein generating the output image of the anatomical structure comprises removing the padding applied to the input image from the output image.

16. The method of claim 11, wherein obtaining the input image of the anatomical structure comprises obtaining under-sampled magnetic resonance (MR) data associated with the anatomical structure and generating the input image using a convolutional neural network trained for reconstructing the under-sampled MR data.

17. The method of claim 11, wherein the input image includes a multi-dimensional magnetic resonance (MR) image of the anatomical structure, the multi-dimensional MR image comprising a readout dimension and a phase-encoding dimension.

18. A non-transitory computer-readable medium comprising instructions that, when executed by a processor included in a computing device, cause the processor to implement the method of claim 11.

* * * * *